United States Patent [19]

Lappos et al.

[11] Patent Number: 5,023,797
[45] Date of Patent: * Jun. 11, 1991

[54] RANGE MAXIMIZING, STABLE, HELICOPTER CRUISE FUEL CONSERVATION

[75] Inventors: Nicholas D. Lappos, Orange, Conn.; David M. Walsh, Jupiter, Fla.; David H. Sweet, Tequesta, Fla.; Charles E. Greenberg, Jupiter, Fla.

[73] Assignee: United Technologies Corporation, Hartford, Conn.

[ * ] Notice: The portion of the term of this patent subsequent to Oct. 11, 2001 has been disclaimed.

[21] Appl. No.: 587,495

[22] Filed: Sep. 20, 1990

Related U.S. Application Data

[63] Continuation of Ser. No. 354,531, May 19, 1989, abandoned.

[51] Int. Cl.[5] .............................................. F02L 9/08
[52] U.S. Cl. ............................. 364/442; 364/431.01; 364/431.05; 244/182; 60/36.281
[58] Field of Search ........... 364/442, 510, 561, 431.02, 364/431.03, 431.04, 431.05; 60/36.281; 244/182

[56] References Cited

U.S. PATENT DOCUMENTS

| 4,312,041 | 1/1982 | DeJonge ............................. 364/442 |
| 4,488,236 | 12/1984 | Morrison et al. .............. 364/431.05 |
| 4,741,503 | 5/1988 | Anderson et al. ................... 364/442 |
| 4,814,993 | 3/1989 | Zapryanov et al. ................ 364/442 |

Primary Examiner—Parshotam S. Lall
Assistant Examiner—Tyrone Queen

[57] ABSTRACT

The reference speed for a helicopter engine is incremented or decremented (237, 239) in dependence upon whether a specific range (miles per unit of fuel) has increased or decreased (236a) in a current period of time compared to the next preceding period of time, separated therefrom by at least 20 seconds (243, 244) to thereby set engine speed for minimizing use of fuel over distance traveled. Fuel is sampled only during steady flight (250-255).

2 Claims, 1 Drawing Sheet

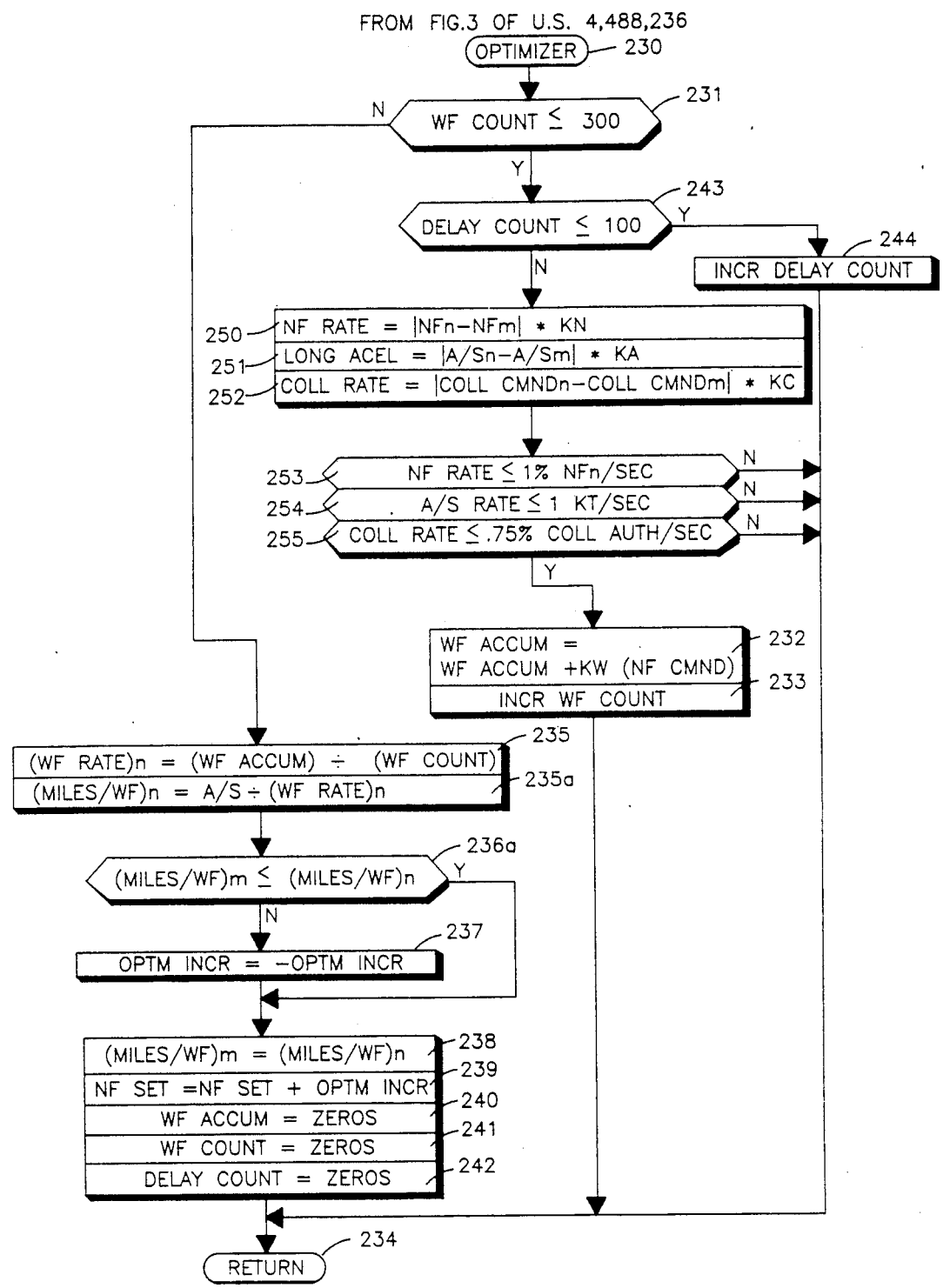

RANGE MAXIMIZING, STABLE, HELICOPTER CRUISE FUEL CONSERVATION

This invention was made with Government support under a contract awarded by the Department of the Army. The Government has certain rights in this invention.

This is a continuation of application Ser. No. 07/354,531, filed May 19, 1989, now abandoned.

DESCRIPTION

1. Technical Field

This invention relates to helicopter engine controls, and more particularly, to providing range-maximizing, stable, minimum fuel consumption during cruise mode.

2. Background Art

In U.S. Pat. No. 4,488,236, a helicopter engine control provides an engine speed set point which is calculated to provide minimum fuel consumption during cruise of the helicopter. An initial optimum fuel conserving speed is established by means of a schedule determined in accordance with aircraft total weight, outside air temperature, altitude and airspeed, and thereafter the speed set point is perturbed upwardly or downwardly and the amount of fuel consumption is monitored to determine whether more or less fuel is utilized at the adjusted speed. The fuel control of the aforementioned patent has proven to be less than successful in conserving fuel effectively, for a variety of reasons. First, the fuel control of the aforementioned patent monitors fuel rate, which is pounds of fuel consumed over a period of time (pounds per hour), and does not take into account the distance which might be covered at that speed during that time. Thus, although minimum rate of fuel consumption may be achieved, the total fuel consumed for the distance traveled typically is not optimum.

The relationship between airspeed and engine speed is such that if an attempt is made to maintain airspeed under pilot control while the cruise fuel conserving feature is turned on, but if the airspeed increases, the fuel control will sense an increase in fuel rate and cause a decrease in engine speed as a result thereof. This may cause a decrease in airspeed which the pilot will then attempt to correct, resulting in a further calculation of a different speed set point for optimal fuel flow. Thus, although mission requirements usually determine the speed to be established by the pilot, either through his own input or by means of the auto pilot, variations therein can cause significant loss of fuel conservation as a result of perturbations and coupling between adjustments of engine speed and adjustments in airspeed.

In addition, small perturbations in aircraft attitude, altitude or speed as a result of wind gusts, or as a result of pilot input, perturb the speed setting, in turn requiring an adjustment in the optimal fuel speed and thus adjustments in the other flight parameters of the aircraft. Thus, it has been been determined that the optimum speed is constantly changing for reasons other than maximizing fuel flow rate, exacerbating the aforementioned problems.

When a fuel control of the type disclosed in the aforementioned patent was improved by optimizing speed based on specific range (distance per unit of fuel, or vice versa), and by not monitoring fuel flow during periods of engine speed or collective pitch changes or during longitudinal acceleration, the fuel consumption was still found to not be optimized. That is, no significant improvement in fuel consumption resulted from having the cruise fuel feature operative compared with when it was turned off.

DISCLOSURE OF INVENTION

Objects of the invention include provision of an optimal, cruise fuel conserving engine control for a helicopter which determines an optimal engine speed set point for maximum range.

This invention is predicated on our discovery that the fuel control of the aforementioned patent does not take into account the adjustments that need to be made when the speed set point of the engine (reference speed) is changed. For instance, if engine speed is decreased to achieve a lower fuel rate, then typically the collective pitch of the aircraft must be increased in order to maintain altitude and/or airspeed, which in turn results in the requirement to change the pitch attitude of the aircraft. This in turn increases loads on the engine which slows it down, requiring more fuel to maintain the newly-set speed, thereby causing the opposite of the desired effect. In the aforementioned patent, fuel samples were ignored for 5 seconds after incrementing the speed set point. Then, 300 samples of fuel flow rate were taken (over a period of 1 minute) before incrementing the set point again. It was thought (in said patent) that the total delay of 1 minute 5 seconds (5 second delay; 1 minute sampling) was adequate to allow the aircraft to settle at a new speed point before setting an additional speed point.

We have discovered that this process caused frequent errors in computation. For example, the upward adjustment in rotor speed would result in a temporary increase in total engine power output (and fuel flow) until the pilot or autopilot adjusts the collective pitch downward to compensate for the unwanted power increase. If sampling begins before this collective pitch compensation is made, the fuel flow will always reflect the change due to the engine power output. This unwanted effect is generally much larger than the change in rotor efficiency sought by the invention.

According further to the present invention, after each adjustment to the optimal engine speed, fuel consumption is ignored for a period of time which is substantially equal to the entire settling and adjusting time required for the aircraft to obtain its proper altitude and attitude at the adjusted speed.

The invention allows setting time to accommodate collective pitch adjustments to adjust for airspeed and altitude variations in response to engine speed changes prior to sampling metered fuel at the new set speed condition. The invention thereby provides an effective, range-maximizing control of speed in a cruise mode.

The present invention is easily implemented in a digital fuel control by means of relatively simple programming. The invention may also be implemented by means of discrete hardware, if desired, utilizing only apparatus and techniques which are readily available and well known in the art, in light of the teachings which follow hereinafter.

The foregoing and other objects, features and advantages of the present invention will become more apparent in light of the following detailed description of exemplary embodiments thereof, as illustrated in the accompanying drawing.

BRIEF DESCRIPTION OF DRAWING

The sole figure herein is a logic flow diagram of an optimizer function, which may be incorporated into the teachings of U.S Pat. No. 4,488,236, in place of FIG. 7 thereof, to achieve the features of the present invention.

BEST MODE FOR CARRYING OUT THE INVENTION

U.S. Pat. No. 4,488,236 (the Patent) is incorporated herein in its entirety.

As described briefly hereinbefore, the cruise fuel conserving engine control of the Patent initially establishes an expected optimal speed by means of a Table which includes optimal speed values for minimum fuel consumption at a variety of variations in aircraft total weight, outside air temperature, altitude and airspeed. Once established, the system is allowed to fade up or down from whatever current speed it has to the assumed optimal speed as determined by the table. After fade up or down to the assumed speed, the control of the Patent begins to repetitively perturb speed by a small amount and measure the fuel consumption differences which result from such perturbations For each perturbation, if fuel consumption goes up, the next cycle utilizes a perturbation in the opposite sense. In the Patent, the "fuel consumption signal" is WF RATE. The actual optimizing through perturbations is achieved in the Patent in accordance with the flow chart illustrated in FIG. 7 thereof When an initial, table-determined fuel conserving speed has been established by the flow chart of FIG. 3 in the Patent, the optimizer routine of the figure herein is reached through an entry point 230, and a first test 231 determines whether or not a large number of samples of actually commanded fuel weight have been taken since the start of the particular optimizing routine, or not. As described in the aforementioned patent, a large number of samples are utilized because there is significant noise (incremental changes which are not indicative of engine/aircraft operation) in the commanded fuel. Since the weight of fuel count is initialized to zero in step 127 of FIG. 6 of the Patent, the first pass through the optimizer routine will always find an affirmative result of test 231, because the count will initially be zero and therefore less than 300. This reaches a test 243 which determines if a settling delay period is complete; the delay count (indicative of a settling delay) is initialized to zero in steps 106 of FIG. 4 in the Patent. A count of 100 equates to twenty seconds in a machine with a 200 millisecond cycle repetition rate.

In the Patent, a delay count is established to achieve approximately 5 seconds of delay prior to beginning to sample the fuel rate which resulted from a speed adjustment. As described in column 8 of the Patent, it was then believed that waiting approximately five seconds before taking 300 samples would provide fuel conservation indications which would take into account adjustments in speed and altitude, and reaching a new stable set of flight parameters. However, in accordance with the present invention, it has been determined that taking samples as soon as five seconds after adjusting the speed for a more optimal fuel flow rate pollutes the data because the fuel flow rates have not settled down and the results of utilizing such fuel flow rates within the first 15 seconds of the sampling, about the first 75 samples after the five second delay, are in fact not indicative of a reestablished stable condition. For this reason, in accordance with the invention, the delay count in the test 243 is 100, being indicative of at least 20 seconds before any sampling can occur. Since the delay count is always initialized to zeros in steps 106 of FIG. 4 of the Patent, the delay count is always zero in the first pass through the optimizer subroutine. Therefore, initially, an affirmative result of test 243 will reach a step 244 in which the delay count is incremented, after which the program returns to the NF SET program of FIG. 3 in the Patent through an exit point 234. In subsequent passes through the optimizer, an affirmative result of test 231 will reach test 243, which will be affirmative, thereby incrementing the delay count in step 244. Eventually, after 100 passes through the routine, the delay count will reach 100, and a negative result of test 243 will reach steps 250-252 and tests 253-255 which determine whether or not flight conditions are sufficiently steady to permit acquiring fuel rate data which could be indicative of whether the speed of the engine should be increased or decreased for maximum specific range. In the step 250, engine acceleration is determined by subtracting engine speed sensed in a prior machine cycle from engine speed sensed in the current machine cycle, taking the absolute value (since it is irrelevant whether the engine is speeding up or slowing down) and multiplying it by some constant, if necessary, to scale it properly for use in test 253. Similarly, the aircraft longitudinal acceleration is generated as the absolute value of current airspeed minus airspeed sampled in the next prior cycle times a constant, in a step 251. A collective pitch command rate is determined in step 252 by taking the absolute value of the difference between the current collective pitch stick command (position) minus the collective pitch stick command of the next preceding cycle, times a constant. The collective command can be taken from a linear variable differential transformer or other collective pitch stick position sensing means which are well known and utilized in most helicopters. Then, in test 253 it is determined whether engine acceleration or deceleration is less than one percent of current engine speed per second; if not, conditions are not steady enough to get sufficiently accurate fuel rate data as to be indicative of a speed giving maximum specific range. Thus, a negative result of test 253 will cause the routine to exit through the point 234, as described hereinbefore. Similarly, a test 254 determines if longitudinal acceleration is less than one knot per second; if it isn't, a negative result of test 254 causes the routine to exit through the point 234. A test 255 determines if the collective pitch stick is moving at a rate less than 75 hundredths of a percent of full collective authority per second; if not, the routine exits through the point 234. On the other hand, assuming that each of the tests 253-255 are affirmative, then a step 232 is reached in which the total weight of fuel (WF ACCUM) is started to be accumulated by adding to the weight of fuel accumulator, a constant times the current weight of fuel commanded. Then, a step 233 increments the weight of fuel counter (to count towards the 300 samples) and the NF SET program, FIG. 3 of the Patent, is returned to through the point 234. After 300 more passes through the optimizer subroutine, which takes about one minute in a 200 millisecond machine (if flight is steady), the test 231 will eventually be negative, reaching a step 235 which provides a current factor of fuel consumption rate. Specifically, a step 232 adds an increment of fuel command to a weight of fuel accumulator (which is initially set at zero by a step 126, FIG. 6 of the Patent).

If during an attempt to acquire 300 good samples, one of the steady tests 253–255 is negative, indicating that something is above the threshhold magnitude, then the steps 232, 233 will be bypassed and the routine will exit through the point 234 as described hereinbefore. So long as any one of the tests 253–255 is negative, further accumulations will not be made. However, if steady conditions again exists, then the count can resume and more samples can be taken. This theory of operation is based on the notion that if the samples taken are representative of steady flight at a given set speed, it matters not that they are taken at different time intervals separated from each other. On the other hand, if it is found to be desirable in any particular utilization of the present invention, negative results from any of the tests 253–255 could first pass through a step (similar to step 241 described hereinafter) which would reset the count to zero so that after steady conditions again existed, a whole new count would begin. Whichever way it is done is irrelevant to the basic precept of this aspect of the invention.

The amount of fuel consumed as determined in step 232 is converted to a fuel rate (fuel per unit of time) in step 235 by dividing the accumulation of step 232 by the count of step 233. Of course, for comparative purposes, the accumulation across the total count could be utilized if desired. However, for an easier understanding, the rate is utilized in order to illustrate how the present invention sets optimal speed for maximum range, rather than for minimum instantaneous rate of fuel consumption. Consider first that airspeed can be expressed as nautical miles per hour (knots). And the rate of weight of fuel consumption, $(WF\ RATE)_n$, is pounds of fuel per hour. When nautical miles per hour is divided by pounds of fuel per hour the result is a specific range of nautical miles per pound of fuel. Maximizing the nautical miles per pound of fuel is one feature of the present invention. This is achieved in a step 235a by dividing airspeed by the current fuel rate. Then a test 236a determines if the previous specific range is equal to or less than the current specific range. If the specific range was less in the previous iteration than it is in the current iteration, this means that the optimizer is working in the right direction so that the sign of an optimum increment of reference speed is also correct. The optimum increment may be about $\frac{1}{4}\%$ of rated speed, or such other amount as is deemed appropriate. On the other hand, if the current iteration consumed relatively more fuel, then the specific range of the previous iteration would be greater than the specific range of the current iteration, which means that the optimizer is working in the wrong direction. In such a case, a negative result of test 236a will cause a step 237 to reverse the sign of the optimum increment, the increment used to perturb speed in one direction or the other while seeking the best speed for fuel conservation. Then, a step 238 causes the last iteration specific range to be updated to this iteration specific range for use in the comparison of a subsequent iteration. A step 239 adds the optimum increment to the current reference speed and steps 240–242 reset to zeros, the weight of fuel accumulator, the weight of fuel counter and the delay counter, for use in the next iteration. Then the NF SET program of FIG. 3 in the Patent is reverted to through the step 234, where the newly incremented speed reference is checked against limits by tests in steps 97–100.

During the next following 400 computer cycles, the settling period delay is counted in the step 244 and then, if the steady tests 253–255 are affirmative, the fuel increments are accumulated in step 232 while the count of fuel increments is incremented in step 233. Then the specific range of that iteration is compared to the specific range determined in the iteration just described, to determine if the sign of the optimum increment should be changed in step 237, and the increment (with or without a change in sign) is added to the previous reference value of NF SET in the step 239. In this fashion, during the optimizer operation of the present invention, the reference speed is perturbed by $\frac{1}{4}\%$ of rated speed (or such other increment as is desired) once about every one and one-third minutes, in steady flight. If specific range has improved, the sign of the optimum increment remains the same; but if specific range is less in any iteration, the sign of the increment is changed.

Ostensibly, assuming perfectly steady state conditions (which of course is impossible in a helicopter driven by a free turbine gas engine) the sign of the optimum increment would change in each iteration. However, if steps are sufficiently small, there is a nearly imperceptible change in engine and helicopter rotor conditions as a consequence thereof, while at the same time having a sufficient change to effect fuel rate.

As described briefly before, since relative specific fuel rate is all that is being compared in the step 236a, it is unnecessary to provide the division of 235. Similarly, depending upon the constancy of cycle time and other factors, a real time clock could be utilized to measure the delay and to accumulate fuel commands over a given time period, in one iteration after the other, if desired, instead of counting delay cycles and accumulating fuel rates over a specific count. This would require that negative results of tests 253–255 stop the clock, or reset the accumulation, to provide a correct accumulation for comparison in adjacent iterations. Of course, another equivalent manner in which the present invention could be practiced is to have the fuel consumption signal be specific fuel consumption (herein defined to be included in the term "specific range") by having the fuel rate divided by airspeed, in which case a minimal specific fuel consumption would be tested for, in a test equivalent to test 236a.

Although not shown in the Figure, each of the parameters in steps 250–252 must be updated in each iteration, in the same manner as in step 238: $NF_m = NF_n$; $A/S_m = A/S_n$; and $COLL\ CMND_m = COLL\ CMND_n$. These steps should be just ahead of the return point 234, so as to be reached by any of the routes through the routine.

As described briefly hereinbefore, it has been found that at least 20 seconds should be allowed to pass before beginning to accumulate fuel rates for a subsequent iteration. Of course, even longer periods of time could be utilized, since a small delay in adjusting a not yet perfect fuel rate is less important than having a constantly wrong fuel rate which results from too short a delay in each iteration. Thus, the invention requires only that the delay be at least 20 seconds (although reality implies not more than a minute, or so).

The use of the setpoint determined in step 239 as described hereinbefore can all be essentially as described in the Patent.

A first important aspect is the optimizing of specific range as in the step 236a, rather than optimizing to an instantaneous minimum fuel flow rate as in the Patent. This is achieved by including airspeed in the optimization. If desired, the airspeed could be provided in an improved fashion in accordance with U.S. Pat. No. 3,382,283, but it need not be.

The gist of the invention, requiring that at least 20 seconds have expired after updating the speed setpoint before sampling fuel rate, as in the test 243, ensures that the fuel increments utilized for a successive iteration are not polluted by transients resulting from a prior iteration.

A third aspect, sensing for certain steady state conditions in the tests 253–255 further assures that the controls of the aircraft, which may be manipulated following changing of the engine speed, and the actual speed of the aircraft have reached essentially a steady state, along with engine speed. Thus, any perturbations from gusts or adjustments made in the flight regime will cause samples to be ignored, thereby providing a much more accurate indication of specific range. If desired, longitudinal acceleration may be taken from a longitudinal accelerometer mounted on the helicopter. Or, the rates used in tests 253–255 could be obtained by differentiation.

The exemplary embodiment herein is described as being implemented within a program of a digital fuel control, as in the aforementioned patent. The particular characteristics of the fuel control are irrelevant, so long as it is of the type that uses a turbine reference speed to control fuel flow to the engine. On the other hand, if a different sort of basic reference were used for the engine of the helicopter, the precepts of the present invention may be readily adapted to accommodate the same. The manner in which the fuel control controls fuel flow is irrelevant to the present invention. The invention is readily implementable in an existing digital fuel control which has the capacity for the algorithms of this invention and the remaining algorithms of the aforementioned patent. The invention is readily implemented for use with any fuel control, having only the NF SET function thereof being altered by the invention. It may be accomplished by dedicated digital hardware or by analog hardware if desired. In such case, it may be implemented in a different fashion from that disclosed herein in accordance with the general equivalence between software as shown herein and dedicated digital hardware and software, which equivalence is described (in a different example) in U.S. Pat. No. 4,294,162. Of course, the present invention may be implemented within a digital automatic flight control system computer such as that shown in U.S. Pat. No. 4,270,168, or otherwise. All of the cycle times, counts, and the like herein may of course be adjusted to suit any implementation and utilization of the invention. All of the foregoing is irrelevant to the invention, it suffices to select the aspects thereof which are desired to be utilized and to provide suitable signal processing to achieve the desired result in accordance with the invention, in a manner suited to the intended implementation or aircraft use.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A control for a helicopter engine having a free turbine for normally driving the helicopter rotors at a rated speed, comprising:

means for providing an actual speed signal indicative of the rotary speed of the free turbine;

fuel valve means for metering fuel to said engine at a rate determined by a fuel command signal applied thereto; and fuel controlling signal processing means connected for response to said actual speed signal, for providing a reference speed signal indicative of desired rotary speed of the free turbine, for providing, in response to said actual speed signal and said reference speed signal, a speed error signal indicative of the difference in turbine speed indicated by said actual speed signal and said reference speed signal, and for providing said fuel command signal to said fuel valve means indicative of a desired fuel flow rate as a function of said speed error signal, said signal processing means responsive to said fuel command signal for, iteratively, in a sequence of successive iteration periods of time, summing a large number of samples of the fuel flow rate commanded to said valve means over a commensurate sampling period of time, the sampling period in each iteration period being separated from the sampling period of the next subsequent iteration period by a settling period, said number of samples being of an order of magnitude to substantially eliminate the effects of noise in said samples on said summation, for providing a current fuel consumption signal reflecting said summation, for providing, near the end of each of said iteration periods, a previous fuel consumption signal equal to said current fuel consumption signal after comparing the current fuel consumption signal provided in the current sampling period with the previous fuel consumption signal provided in the next previous sampling period, for providing a reference speed increment signal indicative of a small fraction of the turbine reference speed, said increment signal having a sign indicative of either an increase or a decrease in turbine speed and a magnitude small enough so that perturbations in engine speed will not unduly perturb the engine or the helicopter and large enough so that the change in reference will cause a change in fuel flow provided to the engine under helicopter flight conditions in which the engine fuel requirements indicated by said summation signal can vary as a function of turbine speed, and for providing in each iteration period, said reference speed signal as the summation of said reference speed signal with said increment signal, for changing the sign of the increment signal in any of said iteration periods in which the current fuel consumption signal indicates a greater rate of fuel consumption than said previous fuel consumption signal provided in the next previous sampling period, so that the reference speed signal is incremented, in successive iteration periods, in the same sense so long as said fuel consumption signal indicates decreased fuel consumption, but is incremented in a reverse sense in the event that said fuel consumption signal indicates increased fuel consumption;

characterized by:

said signal processing means comprising means for summing said large number of samples in sampling periods separated from the sampling period of the next prior iteration by a time period of duration sufficient to allow the engine to react to the change in said fuel command signal as a result of the change in said reference speed signal established in the next prior iteration, to allow the rotor speed and load to react to the change in the engine speed resulting from such change in fuel, to allow the helicopter attitude and speed to react to the changes in rotor speed and load, and to allow the engine to react to changes in rotor load, whereby no fuel samples are taken until the aircraft is fully settled at the engine set speed established in the prior iteration.

2. A control according to claim 1 wherein said settling period is at least 20 seconds.

* * * * *